United States Patent [19]

Clarke

[11] 4,044,629
[45] Aug. 30, 1977

[54] RECIPROCATING PISTON MACHINE

[76] Inventor: John Michael Clarke, Poplars Farm House, Mollington, Banbury, Oxfordshire, England

[21] Appl. No.: 645,011

[22] Filed: Dec. 29, 1975

[51] Int. Cl.² ........................ G05G 1/00; F02B 75/04
[52] U.S. Cl. ............................... 74/579 E; 123/78 B; 123/78 BA
[58] Field of Search ............. 74/828, 835, 836, 579 E, 74/52, 804; 123/78 BA, 78 B, 78 R; 92/13

[56] References Cited
U.S. PATENT DOCUMENTS

| | | | |
|---|---|---|---|
| 1,576,761 | 3/1926 | Hoffman | 123/78 BA |
| 1,931,705 | 10/1933 | Peterson | 123/78 BA |
| 2,394,269 | 2/1946 | Svete | 123/78 B |
| 3,450,111 | 6/1969 | Cronstedt | 123/78 B |

Primary Examiner—Leonard H. Gerin
Attorney, Agent, or Firm—Gifford, Chandler, Sheridan & Sprinkle

[57] ABSTRACT

A reciprocating piston engine, pump or compressor including a crank-shaft having a crank-pin offset laterally from the axis of rotation of the crank-shaft, a connecting-rod pivotally-mounted on the crank-pin and pivotally-connected at the end thereof remote from the crank-pin to a piston, the axis of pivoting of the connecting-rod on the crank-pin being offset laterally from the longitudinal axis of the crank-pin, a non-rotatable gear mounted co-axially of the crank-shaft axis of rotation and a rotatable gear wheel mounted co-axially on the crank-pin for rotation thereon and in mesh with said non-rotatable gear, the connecting-rod being mounted on the rotatable gear for pivoting about an axis offset laterally from the longitudinal axis of the crank-pin, whereby the axis of pivoting of the connecting-rod on the crank-pin follows a predetermined locus as the crank-shaft is rotated.

9 Claims, 10 Drawing Figures

RECIPROCATING PISTON MACHINE

The invention relates to a reciprocating piston machine which term includes both an engine in which a power stroke applied to a piston effects turning of a crank-shaft and a pump or compressor in which a crank-shaft is rotated to effect reciprocation of a piston and thereby to displace or compress a working fluid.

One object of the invention is to provide an engine or pump in which a piston thereof may have strokes of different lengths in the same cycle. This provides a method of improving the efficiency of an engine operating on a Diesel or Otto cycle by employing a longer expansion stroke than compression stroke and thereby to extract some of the energy which is usually wasted in exhaust gases, where the expansion and compression strokes are of the same length.

According to the invention, a reciprocating piston machine including a crank-shaft having a crank-pin offset laterally from the axis of rotation of the crank-shaft and a connecting-rod pivotally mounted on the crank-pin and pivotally-connected at the end thereof remote from the crank-pin to a piston reciprocable in a cylinder has the axis of pivoting of the connecting-rod on the crank-pin offset laterally from the longitudinal axis of the crank-pin and includes means whereby the axis of pivoting of the connecting rod on the crank-pin follows a predetermined locus as the crank-shaft is rotated.

Conveniently, the means for producing said predetermined locus comprises a non-rotatable gear mounted co-axially of the crank-shaft axis of rotation and a rotatable gear wheel mounted co-axially on the crank-pin for rotation thereon and in mesh with said non-rotatable gear, the connecting-rod being mounted on the rotatable gear for pivoting about an axis offset laterally from the longitudinal axis of the crank-pin.

The non-rotatable gear may be an annular gear having internal teeth in mesh with external teeth on the rotatable gear wheel. Where the machine is required to have a 4-stroke cycle, the ratio of the teeth on the non-rotatable and rotatable gears is 3:2.

Alternatively, the non-rotatable gear may have external teeth in mesh with external teeth on the rotatable gear wheel. Where the machine is to operate on a 4-stroke cycle, the ratio of the teeth on the non-rotatable and rotatable gears is 1:2.

The means for producing said predetermined locus may be adjustable whereby the lengths of the respective strokes of the piston during a cycle may be altered.

Where the means for producing said predetermined locus comprises the aforesaid non-rotatable and rotatable meshing gears, the non-rotatable gear may be adjustable circumferentially, thereby to effect circumferential adjustment of the rotatable gear wheel about the crank-pin axis and hence the distance by which the axis of pivoting of the connecting-rod is offset laterally from the longitudinal axis of the crank-pin, that is the eccentricity of the connecting-rod with respect to the crank-pin.

Adjustment may be performed either when the machine is not in operation or during its operation and may be performed manually or by mechanical, fluid-operable electrical or other means or any combination thereof with respect to an operational condition or parameter of the machine.

Alternatively, the crank-pin may be adjustable circumferentially relatively to the rotatable gear wheel.

By way of example, several embodiments of an internal combustion engine having a reciprocating piston are now described with reference to the accompanying drawings, in which.

Figure 1:
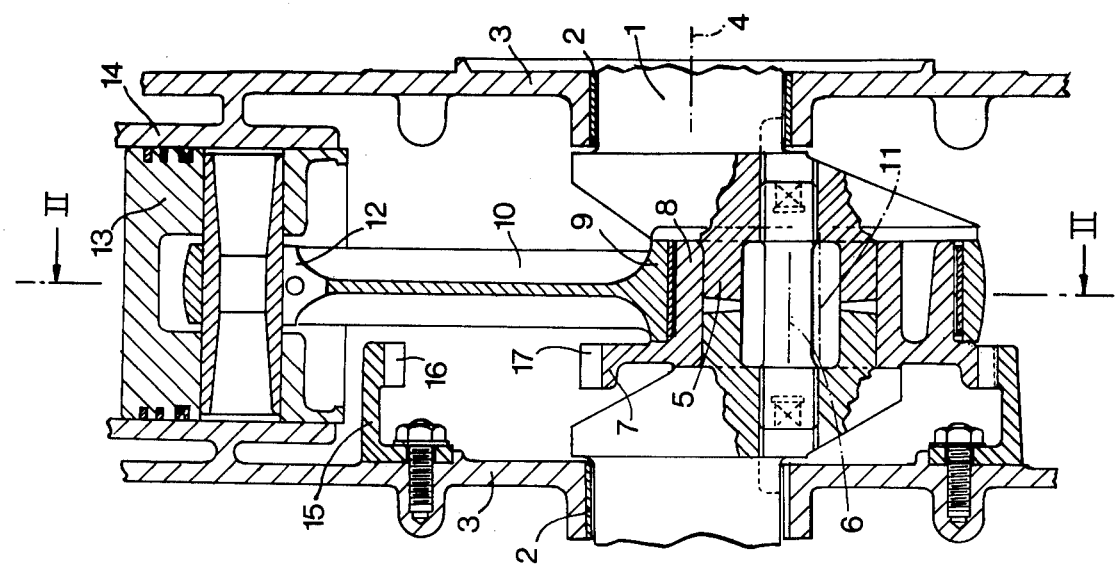
FIG. 1 is an axial section through a cylinder of the first engine.
Figure 2:
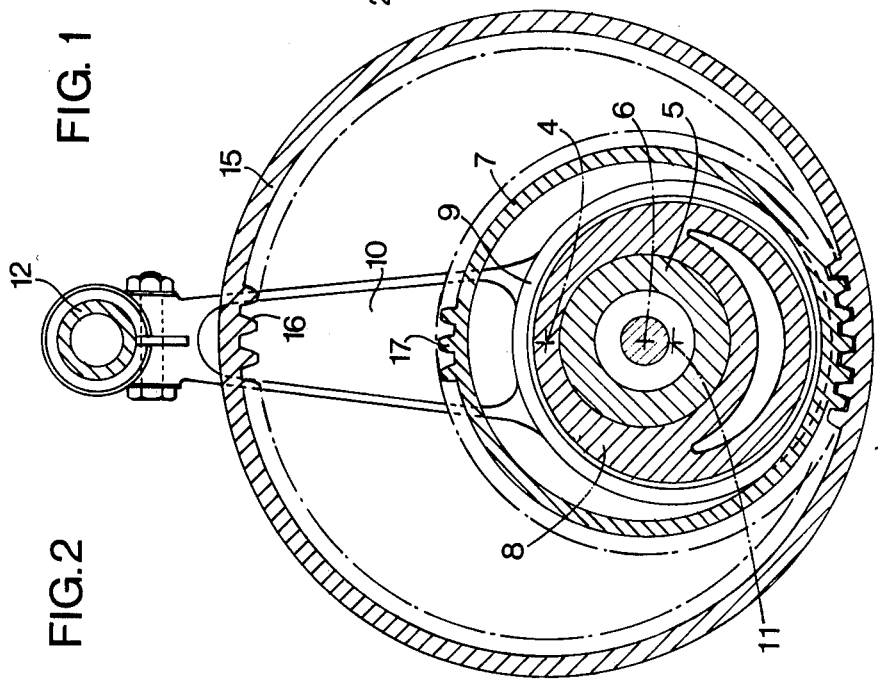
FIG. 2 is a section of the line II—II in FIG. 1.

Referring firstly to FIGS. 1 and 2, the first engine (of which only one cylinder is shown) comprises a crank-shaft 1 mounted in bearings 2 in a housing 3 for rotation about an axis 4. One crank-pin 5 having its axis 6 offset laterally from the crank-shaft axis 4 is shown. The crank-pin 5 carries a gear wheel 7 co-axial with the axis 6 and rotatable on the crank-pin 5. An axial extension of the gear wheel 7 is formed as an eccentric 8 on which the big end 9 of a connecting-rod 10 is pivotally-mounted, the axis of pivoting 11 of the big end 9 being eccentric, i.e., offset laterally, with respect to the axis 6 of the crank-pin 5. The little end 12 of the connecting-rod 10 carries a piston 13 reciprocatable in known manner in a cylinder 14. The housing 3 carries a non-rotatable annular gear 15 co-axial with the crank-shaft axis 4. The annular gear 15 has internal teeth 16 with which external teeth 17 of the rotatable gear wheel 7 are meshed.

Figures 5, 6:
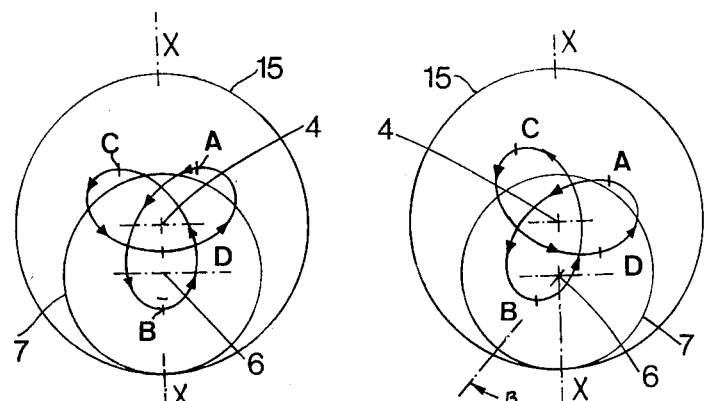
FIGS. 5, 6 and 7 are diagrams showing the locus of the axis of the big end of the connecting-rod of the engine shown in FIGS. 1 and 2 and the effect on the locus of circumferential adjustment of the non-rotatable gear.

When the crank-shaft 1 is rotated the gear wheel 7 will travel around the inside of the non-rotatable annular gear 15 and during this movement it will also rotate about the axis 6. This will cause the eccentric 8 to turn about its axis 11 and so the connecting-rod 10 will be moved to effect reciprocation of the piston 13 in its cylinder 14. Due to the eccentric 8, the locus of the axis of the big end 9 will not be circular as in an orthodox reciprocating engine; instead the big end axis will follow the locus A B C D A for a four-stroke engine as shown in FIG. 5 in which the portion A B corresponds to the expansion stroke of the piston; B C corresponds to the exhaust stroke; C D corresponds to the induction stroke and D A corresponds to the compression stroke. The corresponding path of the piston can readily be determined from the locus A B C D A. It is evident from the locus A B C D A that the maximum obliquity of the connecting-rod during the expansion stroke is less than in an orthodox reciprocating engine. This has the advantage that there is reduced piston side thrust on the cylinder wall. The gear ratio of the gears 7 and 15 necessary to produce the locus A B C D A for a 4-stroke engine is 2:3. FIGS. 1 and 2 show the bottom dead-centre position corresponding to point B in FIG. 5 of the connecting-rod 10 and piston 13 and eccentric 8. After one revolution of the crank-shaft, the gear wheel 7 and the eccentric 8 will have turned through half a revolution in the opposite direction, i.e., the eccentric will be 180° out of phase from the position shown in FIG. 2 and the big end axis will be at the bottom dead-centre position D. After another revolution of the crank-shaft, the gear wheel 7 and the eccentric 8 will have turned in the opposite direction through half a revolution, i.e., the eccentric will be in the position shown in FIG. 2 and the big end axis will be at the bottom dead-centre position B.

Figure 3:
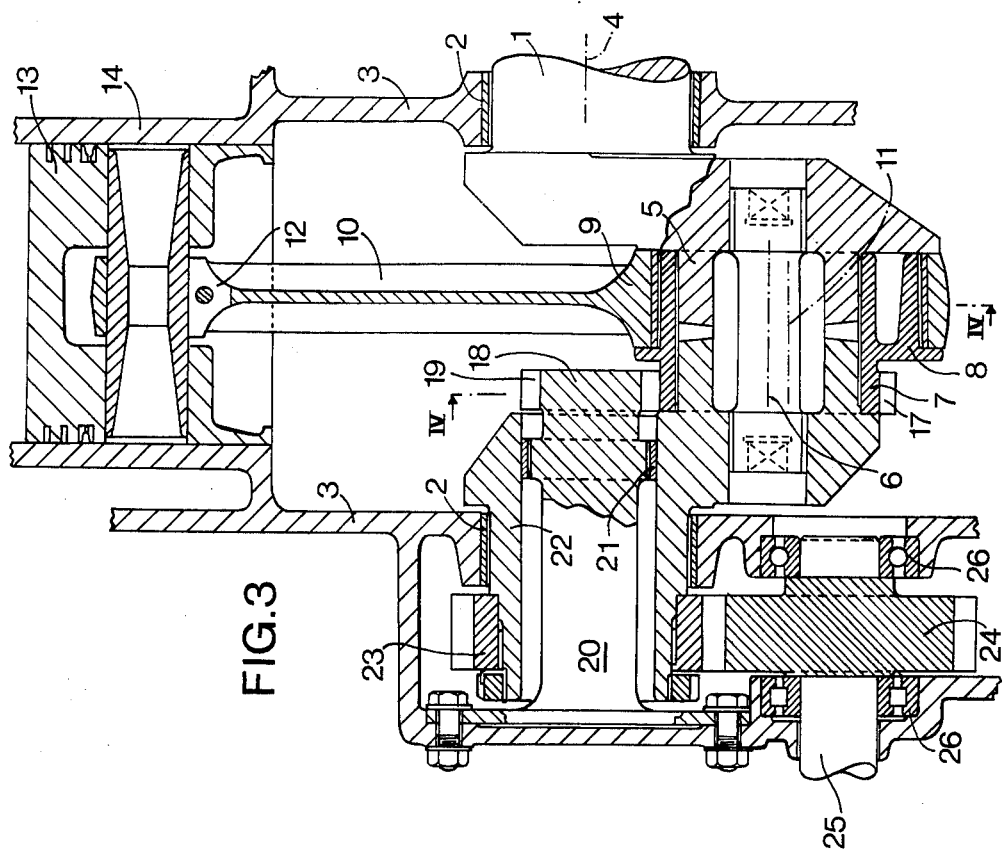
FIG. 3 is a view similar to FIG. 1 of the second engine.
Figure 4:
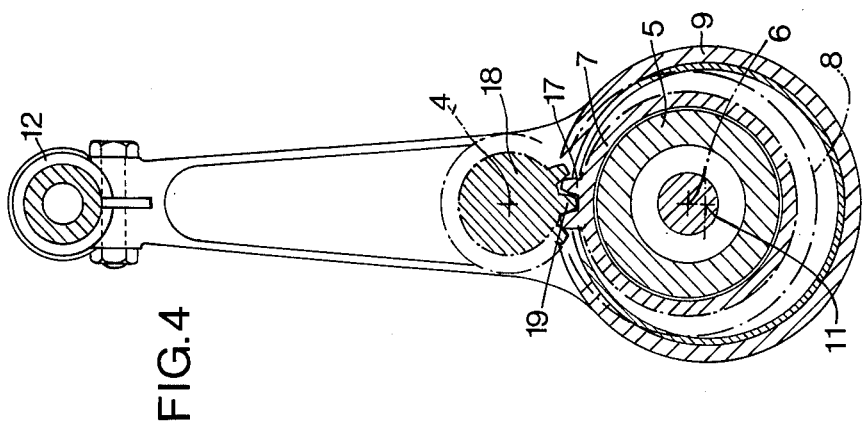
FIG. 4 is a section of the line IV—IV in FIG. 3.

In the second embodiment of engine shown in FIGS. 3 and 4, parts like those in FIGS. 1 and 2 are shown by the same reference numbers. The principal difference between the embodiments is that instead of the non-rotatable gear being annular and having internal teeth, the non-rotatable gear is a fixed pinion 18 and has external teeth 19 with which the teeth 17 of the rotatable gear wheel 7 mesh.

In operation, as the crank-shaft 1 is turned, the rotatable gear wheel 7 will travel around the non-rotatable gear 18 and during this motion, the gear wheel 7 will be rotated and the big end axis of the connecting-rod 10 will follow a locus similar to the locus A B C D A shown in FIG. 5. For a four-stroke cycle, the gear ratio of the rotatable to non-rotatable gears must be 2:1. Thus after one revolution of the crank-shaft from the bottom dead-centre position shown in FIGS. 3 and 4 (i.e., B in FIG. 5), the gear wheel 7 and the eccentric 8 will have turned in the same direction through 1½ revolutions to the bottom dead-centre position D in FIG. 5. Then after another revolution of the crank-shaft, the gear wheel 7 and the eccentric 8 will have turned through another 1½ revolutions to the bottom dead-centre position B in FIG. 5.

Figure 7:
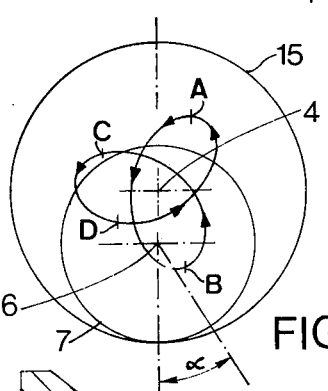

In either embodiment, adjustment of the rotatable gear and the eccentric in the circumferential direction relatively to the big end 9 or vice versa will alter the angular positions of the top and bottom dead-centres with respect to the longitudinal axis of the piston and cylinder. The effect of such clockwise adjustment through an angle $\beta$ and anticlockwise adjustment through an angle $\alpha$ is shown by comparing FIGS. 6 and 7 respectively with FIG. 5. In each of FIGS. 5 and 6, the projection of the points A, B, C and D horizontally on the longitudinal axis of the piston X—X indicates the lengths of the respective strokes. Thus in FIG. 6 the compression and expansion strokes are shorter and the exhaust and induction strokes are longer than the corresponding strokes in FIG. 5. Conversely in FIG. 7, the compression and expansion strokes are longer and the exhaust and induction strokes are shorter than the corresponding strokes in FIG. 5. The embodiments shown in FIGS. 1 and 2 or FIGS. 3 and 4 differ from an orthodox engine in that the expansion stroke is longer than the compression stroke. By adjusting the non-rotatable gear in accordance with FIGS. 6 and 7, the lengths of the strokes and their ratios are altered. Thus an adjustment can be made to select the optimum ratio of compression to expansion strokes suitable to the engine operating conditions appertaining at any time. For example a high compression ratio could be selected on starting and a lower compression ratio could be selected during normal running conditions.

Turning again to FIG. 3, means ane shown for angularly adjusting the crank-pin 5 in the circumferential direction relatively to the eccentric 8. The adjusting means comprises mounting a gear 18 on a fixed shaft 20 extending through a tubular part 22 of the crank-shaft 1 and supporting the latter for turning on a bearing 21 on the fixed shaft 20. The tubular crank-shaft part 22 carries a pinion which is in mesh with a driving pinion 24 mounted on an adjusting shaft 25 supported in bearings 26. Angular adjustment of the shaft 25 in either direction effects corresponding angular adjustment of the pinion 23 and hence of the crank-shaft relatively to the eccentric 8 and rotatable gear 7.

Figures 9, 10:
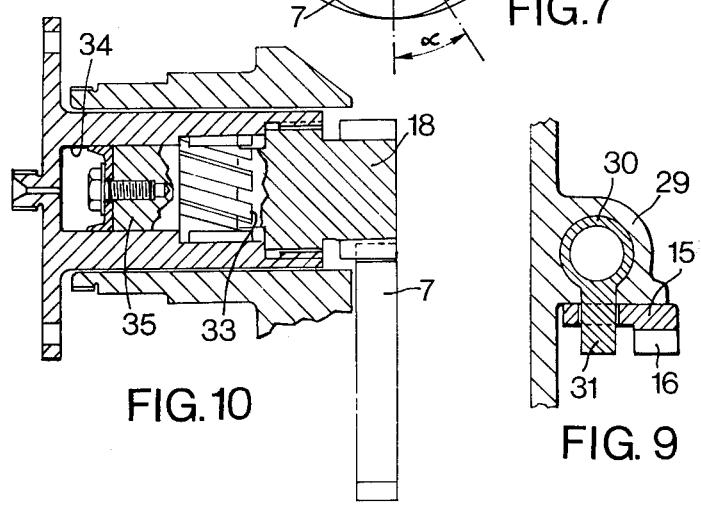
FIG. 9 is a section on the line IX—IX in FIG. 8.
FIG. 10 shows a modification of part of FIG. 3 in which the non-rotatable gear is circumferentially adjustable.
Figure 8:
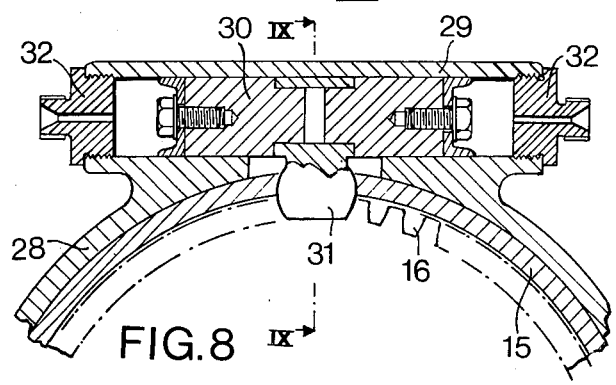
FIG. 8 shows a modification of part of FIG. 2 in which the non-rotatable gear is circumferentially adjustable.

FIGS. 8 and 9 show means for circumferentially adjusting the non-rotatable annular gear 15 of the embodiment of FIGS. 1 and 2. Instead of the annular gear 15 being bolted to the housing 3 as shown in FIG. 1, it is mounted in a housing part 28 carrying a cylinder 29 and piston 30. The piston 30 carries a pin 31 engaging the gear 15. On the application of fluid pressure to one or other ends 32, of the cylinder 29, the piston 30 will be moved to the left or to the right and hence will turn the annular gear 15 in the housing part 28. This adjustment will in turn move the gear wheel 7 and the eccentric 8 circumferentially relatively to the crank-pin 5.

FIG. 10 shows a method of adjusting the non-rotatable gear 18 circumferentially, this method being alternative to the circumferential adjustment of the crank-shaft, as shown in FIG. 3. In FIG. 10, the gear 18 is carried by a helically-splined shaft 33 engaging complementary splines in a wall of a cylinder 34. The cylinder 34 contains a piston 35 integral with the splined shaft 33. On application of fluid pressure to the cylinder 34, the piston 35 will be moved therein and this movement will effect turning of the gear 18 by the splines of the shaft 33 and the complementary splines in the cylindrical wall. The gear 18 on being turned will turn the gear wheel 7 and this in turn will effect circumferential adjustment of the eccentric 8 relatively to the crank-pin 5.

The adjustment by any of the means shown in FIGS. 3, 8 and 9, or 10 may be made manually or automatically in response to an operational condition or parameter of the engine. The adjustment may be made before operation of the engine or while it is operating. Alternatively to mechanical adjustment, for example by turning the shaft 25 in FIG. 3, or the fluid-operable adjustment of FIGS. 8 and 9 or 10, an electrical adjuster or any other suitable adjuster or any combination of mechanical, fluid-operable or electrical adjustment means may be emoloved.

Although the foregoing embodiments are applied to an internal combustion engine, the invention may be applied to a reciprocating piston pump or compressor.

What I claim as my invention and desire to secure by Letters Patent of the United States is:

1. A reciprocating piston machine including a cylinder, a piston reciprocatable therein, a crank-shaft, a crank-pin offset laterally from the axis of rotation of said crank-shaft, a connecting-rod pivotally-mounted on said crank-pin and pivotally-connected at the end thereof remote from said crank-pin to said piston, the axis of pivoting of said connecting-rod on said crank-pin offset laterally from the longitudinal axis of said crank-pin, and means constraining the axis of pivoting of said connecting-rod on said crank-pin to follow a predetermined locus as said crank-shaft is rotated, said constraining means comprising a non-rotatable gear mounted co-axially of the crank-shaft axis of rotation and a rotatable gear wheel mounted co-axially on said crank-pin for rotation thereon and in mesh with said non-rotatable gear, said connecting-rod mounted on said rotatable gear to pivot about an axis offset laterally from the longitudinal axis of said crank-pin.

2. A reciprocating piston machine as claimed in claim 1 in which said non-rotatable gear is an annular gear having internal teeth in mesh with external teeth on said rotatable gear wheel.

3. A reciprocating piston machine as claimed in claim 1 in which said non-rotatable gear has external teeth in mesh with external teeth on said rotatable gear wheel.

4. A reciprocating piston machine as claimed in claim 1 in which said constraining means is adjustable to alter the lengths of the respective strokes of said piston during a cycle of said machine.

5. A reciprocating piston machine as claimed in claim 4 in which said non-rotatable gear is adjustable circumferentially to effect circumferential adjustment of said rotatable gear wheel about said crank-pin axis and hence the distance by which the axis of pivoting of said connecting-rod is offset laterally from the longitudinal axis of said crank-pin, said distance defining the eccentricity of said connecting-rod with respect to said crank-pin.

6. A reciprocating piston machine as claimed in claim 5 in which said adjustment is performed when said crank-shaft is stationary.

7. A reciprocating piston machine as claimed in claim 5 in which said adjustment is effected by manual adjustment.

8. A reciprocating piston machine as claimed in claim 5 in which said adjustment is effected automatically with respect to an operational condition of the machine during rotation of said crank-shaft.

9. A reciprocating piston machine as claimed in claim 4 in which said crank-pin is adjustable circumferentially relatively to said rotatable gear wheel.

* * * * *

UNITED STATES PATENT AND TRADEMARK OFFICE
CERTIFICATE OF CORRECTION

PATENT NO. : 4,044,629
DATED : August 30, 1977
INVENTOR(S) : John Michael Clarke It is certified that error appears in the above-identified patent and that said Letters Patent are hereby corrected as shown below:

Col. 1, line 3, insert --Background of the Invention--;

Col. 1, above line 10, insert --Summary of the Present Invention--.

Col. 2, above line 3, insert --Brief Description of the Drawings--;

Col. 2, above line 25, insert --Detailed Description of the Present Invention--;

Col. 2, line 37, delete "reciprocatable", insert --reciprocally received--.

Col. 3, line 64, delete "ane", insert --are--.

Col. 4, line 45, delete "emoloved", insert --employed--.

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*